United States Patent [19]

Tellone

[11] Patent Number: 4,516,166
[45] Date of Patent: May 7, 1985

[54] DEVICE FOR THE AUTOMATIC COMPUTER-CONTROL OF THE OPERATION OF A PLURALITY OF VIDEORECORDERS

[75] Inventor: Mauro Tellone, Settimo Torinese, Italy

[73] Assignee: CSELT-Centro Studi e Laboratori Telecomunicazioni S.p.A., Turin, Italy

[21] Appl. No.: 427,319

[22] Filed: Sep. 29, 1982

[30] Foreign Application Priority Data

Dec. 7, 1981 [IT] Italy ............................... 68586 A/81

[51] Int. Cl.³ ............................................. G11B 15/18
[52] U.S. Cl. .................................... 360/72.1; 360/14.3
[58] Field of Search ...................... 360/14.3, 14.2, 71, 360/72.1, 72.2, 73

[56] References Cited

U.S. PATENT DOCUMENTS 4,100,607 7/1978 Skinner ........................... 360/14.2 X
4,225,890 9/1980 Takenaka et al. ................... 360/72.1

OTHER PUBLICATIONS

AMPEX Manuals relating to VPR-1 and VPR-2 devices.

*Primary Examiner*—Robert L. Richardson
*Attorney, Agent, or Firm*—Karl F. Ross; Herbert Dubno

[57] ABSTRACT

The device comprises a plurality of circuits interfacing a computer with a plurality of professional videorecorders, for the automatic control by computer of all the operations carried out by the video-recorders. Each of the interface circuits requests of the computer only data allowing its addressing, data identifying an image sequence on which the video-recorder must operate and data on the kind of operation to carry out, and comprises a logic circuit, which is capable of shortening the time taken by the videorecorder to search for the sequence and determines the direction and the speed of the magnetic tape depending on the determination of the position of the point being read on the tape with respect to the sequence position, and a further circuit able to detect errors of data setup by the computer and errors due to data misinterpretation by the videorecorder.

8 Claims, 6 Drawing Figures

DEVICE FOR THE AUTOMATIC COMPUTER-CONTROL OF THE OPERATION OF A PLURALITY OF VIDEORECORDERS

FIELD OF THE INVENTION

The present invention relates to television signal processing and, more particularly, to a device built up by a plurality of interface circuits placed between a computer and a plurality of professional videorecorders for the automatic computer control of the videorecorder operations.

BACKGROUND OF THE INVENTION

The problem of the automatic control of the operations being carried out by a plurality of videorecorders in a professional videorecording and playing system arises when operations such as video-signal editing, i.e., a processing allowing erasing replacement or superposition of determined sequences of said signal coming from one or more recorders, are to be effected.

To keep professional characteristics video-signal editing is to be made with at least a one frame accuracy. Besides each processing of the video signal must not alter the frame synchronism and must not affect the image e.g. by dropouts.

Video-recorders capable of these functions must have highly-professional characteristics, such as:

one frame accuracy of the positioning of the recording magnetic tape;

variable speed of the magnetic tape;

internal generation of a progressive digital code, to identify the images with a time progression and a one frame resolution, coded by hours, minutes, seconds, frames (1 sec=25 frames).

Particularly when the number of videorecorders involved is rather high and when the number of sequence editings is high, the automatic control proves a valid means to speed up and optimize the time taken to execute the operations as well as to minimize the error probability.

Furthermore in the big television production centers, where as a rule at least one computer already exists, it proves particularly useful and advantageous to it also for the automatic control of the videorecorder system. Thus, the computer, besides carrying out its usual tasks, can manage the automatic control as well as all the video-signal switchings among the transmitting and/or receiving units such as television cameras, studios, monitors.

The main problem arises from the necessity to realize highly autonomous interface circuits requiring the least information interchange possible with the computer, and consequently the shortest time occupation possible of the computer CPU (central processing unit).

A further problem is to make an automatic control system allowing the contemporaneous execution of a plurality of operations among different video-recorders.

Still another problem arises from the necessity to detect and signal errors which may be made while storing the data into the computer.

Finally there is the problem arising from the necessity to detect and correct misinterpretations by the videorecorders of data arriving from the computer.

At present an automatic control unit exists, the HPE1 by Ampex. This unit comprises a microcomputer allowing the control of 4 videorecorders; an internal memory is provided where data of 100 digital codes, identifying the entrance and exit points of sequences to be edited, can be stored. This unit performs one operation at a time, stopping after each operation and waiting for the command for the next operation; in case of an editing, the operator must set from outside the address (consisting of two decimal digits) to recall the code previously stored in the internal memory.

This operation can be effected by an external computer by a suitable interface placed between the control unit and said computer.

Yet a possible connection to an external computer is not convenient as this control unit is designed to operate autonomously, as it already comprises an intelligent microcomputer-based unit. Then the management of a dialogue between said unit and an external computer is excessive and complicated and requires too long CPU time.

E.g., it is too complicated to modify and set again the data of the sequences to be processed, once these data have been stored into said control unit.

Another disadvantage is that only one operation at a time can be executed and not two or more operations; besides said unit stops after each operation. Then it demands too many manual commands, thus increasing too much the overall operation time.

SUMMARY OF THE INVENTION

These problems are solved by the present invention of a device consisting of a plurality of circuits interfacing a computer with a plurality of videorecorders for the automatic control of the operations carried out by said videorecorders, and particularly for the editing of the TV signal.

BRIEF DESCRIPTION OF THE DRAWING

The features of this device will become clearer from the following description of a non limitative example of embodiment and from the annexed drawing, in which.

SPECIFIC DESCRIPTION

Figure 1:
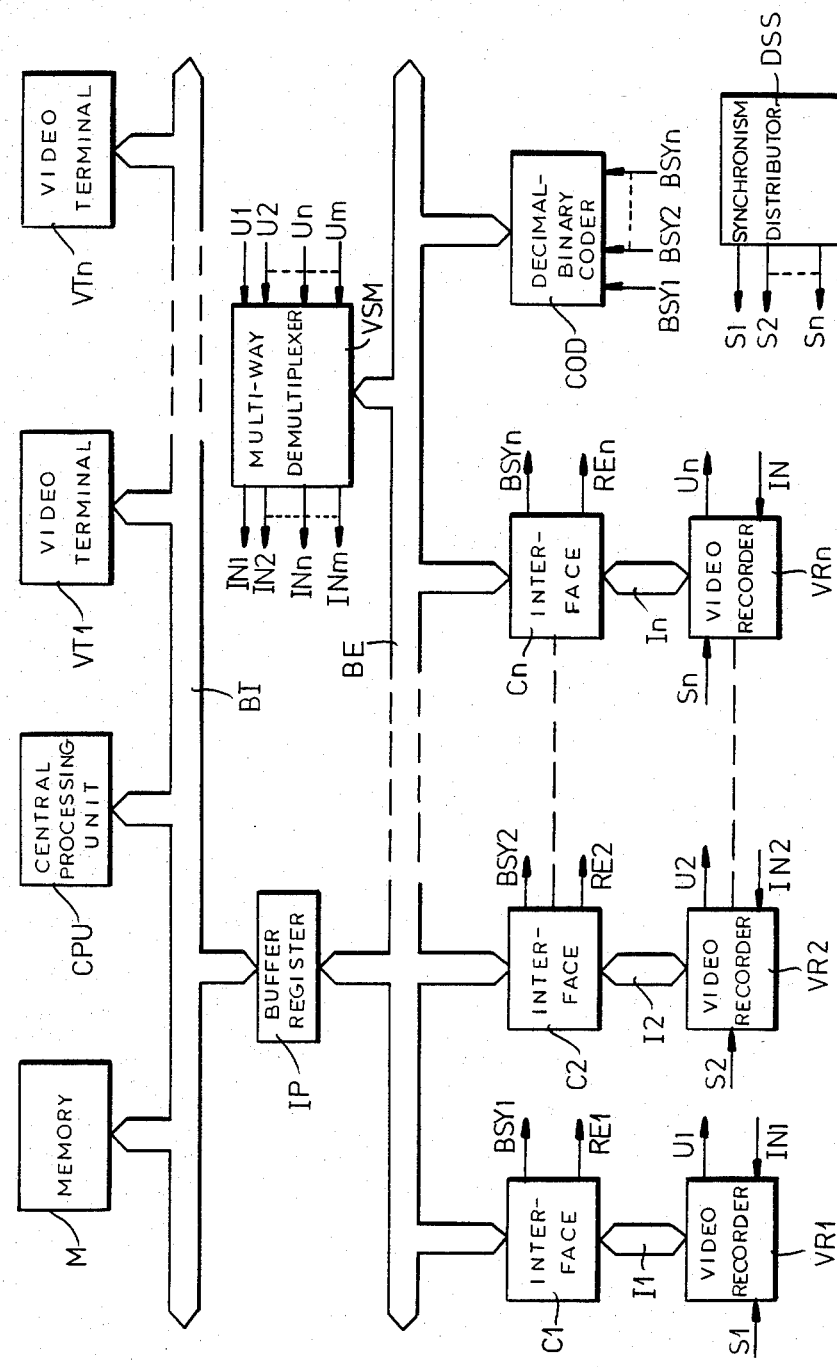
FIG. 1 shows a general information flow diagram in which the device, provided by present invention, is inserted.

In FIG. 1, references VR1, VR2, . . . , VRn denote the n videorecorders whose operation is to be automatically controlled; as will be better explained hereinafter, the only limitation to number n of videorecorders is given by the input-output addressing capability of the computer used.

In the above described embodiment the videorecorders are assumed to be AMPEX VPR2 videorecorders. Their main technical features have been already expounded in the introductory section of this description; as to their operation, what follows is added.

As mentioned the tape speed can be made variable. This possibility of operation referred to as "shuttle mode" will be used to control the tape speed during the search for the entrance and exit points of the video signal sequences to be processed. When the tape is positioned on the desired point, e.g., at the entrance point, a signal applied to a suitable videorecorder input (entrance input) will allow the storage, into a suitable internal memory of the videorecorder, of the time digital code relative to the frame being read by the head; said code is previously generated by the videorecorder itself and recorded in one of the available audio tracks and will be interpreted by the videorecorder as the sequence entrance-point.

Analogously, for the exit point, the storage of the corresponding digital code into said internal videorecorder memory, can be controlled from the outside by means of another signal applied to another suitable input (exit input).

When both the entrance and the exit points have been stored, a command which activates the so-called search operation is to be sent to the recordes, i.e., the videorecorder positions the magnetic tape at a point which precedes by about seven seconds the entrance point of the sequence, according to the usual play speed. A "record/play" command allows then the tape to begin its motion at the usual play speed so that the wished operation may be effected in correspondence with the predetermined sequence.

The search operation allows the videorecorder servo-mechanisms to attain the correct play speed before the entrance into the desired sequence.

Still in FIG. 1 references C1, C2, . . . Cn, denote interface circuits, one per each videorecorder, which are the object of the present invention said circuits will be described in detail in connection with FIG. 2 said interface circuits are connected to the associated videorecorders through interconnections I1, I2, . . . , In. Each interface circuit C1, C2, . . . , Cn is connected through the external bidirectional bus BE to a conventional parallel register IP which acts as input-output interface for the computer. Besides each interface circuit C1, C2, . . . Cn emits two signals on wires BSY1, BSY2, . . . , BSYn and respectively RE1, RE2, . . . REn, which will be explained hereinafter.

Reference VSM denotes a circuit consisting of a usual switching and decoding matrix (demultiplexer): upon a suitable addressing by the computer, this circuit allows each of its inputs to be connected with each of its outputs. In addition said switching unit is multipath, i.e., it can connect a plurality of input wires to an equal number of output wires.

Outputs U1, U2, . . . , Un of videorecorders VR1, VR2, . . . , VRn are connected to the first n inputs of VSM; each output U1, . . . Un consists of the wires carrying the videosignal, the associated audio signal, and the signal ES, which will be described later; the remaining inputs (Un+1, . . . , Um) of VSM can be connected to the video and audio signal outputs of other apparatuses, such as telecameras.

The first n outputs of VMS are connected to videorecorder inputs IN1, IN2, . . . , INn, while the remaining outputs, from IN (n+1) up to INm, can be connected to the inputs of other possible devices such as monitors; of course also inputs IN1, . . . , INn of the videorecorders are composed of wires carrying the video-signal, the associated audio signal, and the signal ES.

Then each video/audio output of a determined apparatus can be connected to the video/audio input of any other apparatus.

Reference COD denotes a usual decimal-to-binary encoder which receives at its n inputs signals BSY1, BSY2, . . . , BSYn outgoing respectively from interface circuits C1, C2, . . . , Cn; the output bus of COD is linked to bus BE.

Circuit COD is to supply the computer with a binary encoded "busy" signal for each of the apparatuses being working, as will be better explained hereinafter. The number n of videorecorders determines the number of bits used to generate said binary code.

Reference BI denotes the bus interconnecting the computer used, schematized in the Figure through blocks CPU (Central Processing Unit) and M (memory unit), with external input-output units, such as interface circuits C, videorecorders VR and video terminals VT1, . . . , VTn, wherefrom the various operations which are to be carried out can be controlled.

Block DSS denotes a usual distributor of the TV synchronism signals necessary to synchronize the videorecorders. Outputs S1, S2, . . . , Sn of DSS are connected to the video synchronism inputs of the videorecorders; these inputs are also denoted by S1, . . . , Sn.

Figure 2:
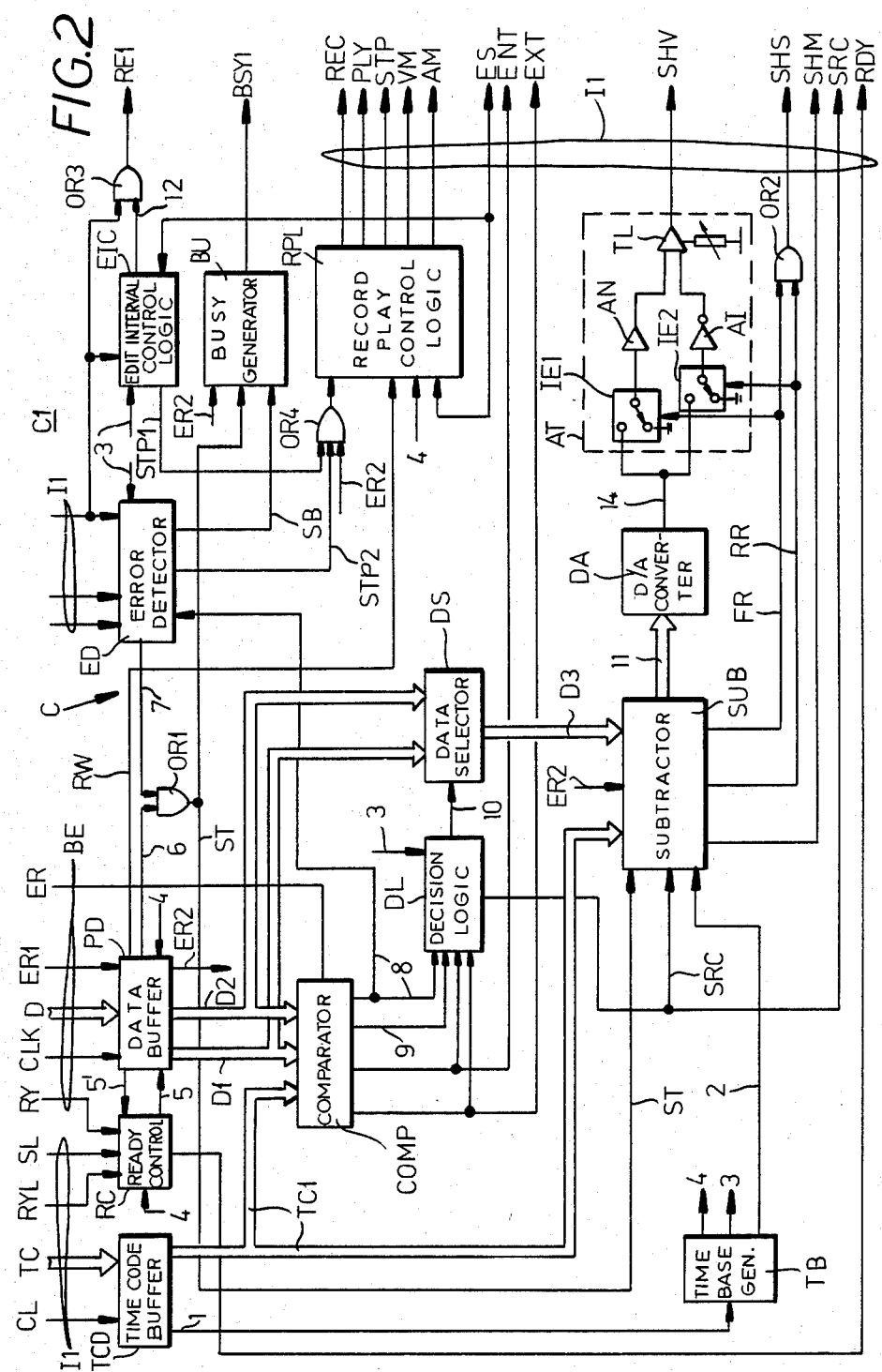
FIG. 2 shows the block diagram of a possible embodiment of one of the interface circuits C1 of the device.

The scheme of the interface circuit C1 of FIG. 1 is shown in FIG. 2.

Since the interface circuits C1, C2, . . . , Cn of FIG. 1 are identical, the statements concerning interface circuit C1 of FIG. 2, apply also to all the other interface circuits.

To simplify the symbols used, in FIG. 2, the wires belonging to bus I1, which will be widely disclosed hereinafter, have no subscript 1 but it is clear that they belong only to bus I1. Instead, the wires and the connections belonging to bus BE are common to all the interface circuits C, as will be disclosed later.

Reference TCD denotes a block performing as a register parallelizing the time code data (frame identification data). A first input of TCD is connected is the four-wire connection TC, which is part of bus I1 arriving from the corresponding videorecorder VR1, (FIG. 1) and carries the data of the digital time code identifying the sequence of TV frames being read by the videorecorder. The code is the conventional BCD code and the data are sent to VR1 in 4-bit parallel form, that is one decimal digit at a time, in the following order: tens of minutes, minutes, tens of seconds, seconds, tens of frames, frames, up to a maximum of 59' 59" and 25 frames (the frames are encoded from "00" to "24"). This maximum has been set supposing that the maximum tape length corresponds to an hour (1 h) of usual image recording. The sending of a code is synchronized by the 4 μs clock signal CL coming from VR1 and applied to the clock input of TCD (FIG. 2): four bits, that is a binary coded decimal digit, are stored at every clock pulse of CL into a conventional 24-bit parallelizing register connected to the input of TCD and not shown in the Figure.

The eighth pulse of each set of eight clock pulses has a shorter duration than the others (1 μs), so that a conventional divider by 8, built in said block TCD, can extract in known manner a 32 μs synchronization pulse which is made available at the output on wire 1. This 32 μs clock pulse will allow also the code bits stored in the parallel register to be sent onto bus TC1.

TB denotes a conventional timing signal generator which receives the 32 μs clock signal present on wire 1 and supplies: on output 2 a 32 μs clock signal, on output 3 a 0.5 s clock signal, and on output 4 a 1 s clock signal.

Hereinafter, unless differently stated, the various signals incoming and outgoing from the interface C1 as well as the internal signals interchanged among the various circuit blocks (apart from the timing signals and the data present on the various buses inside and outside C1) are to be considered "active low" i.e., active when their logic level is "0".

RC denotes a block controlling signals on wires RY, SL, RYL, connected to its inputs. Block RC comprises a conventional receiving circuit, enabled by the signal coming through wire 5' from block PD (which will be described hereinafter) and apt to receive a "Ready" signal sent by the computer through wire RY. Wire RY belongs to bus BE (see also FIG. 1) and is therefore common to all the interface circuits C; yet the signal on wire RY will be received only by that block RC which is enabled by the signal on wire 5'. The signal on wire RY is a pulse apt to preset to operation the videorecorder mechanisms: in fact, upon reception of said pulse, a conventional flip-flop in said block RC generates a pulse having the same duration as the clock signal received from block TB through wire 4 and supplies it on wire RDY towards the videorecorder. At the same time said "ready" pulse presets a counter, in said block RC, to begin a 5 s long counting. The counter is clocked by the 1 s pulse present on wire 2 and distributed by block TB.

If after that 5 s time the so-called "ready lamp" signal is present on wire RYL coming from VR1, then the output of said counter will set a conventional flip-flop in RC. Said flip-flop will supply an enable signal on wire 5 which will remain in the active (ON) state as long as the videorecorder is in the "ready" condition.

A second pulse supplied on wire RDY stops the video-recorder mechanisms. The videorecorder after a certain time period in which it has been ready without carrying out any operation, emits a square-wave signal which is also supplied through wire SL to block RC of the interface.

Block RC comprises a conventional modulo-4 counter which at the fourth period of signal SL causes the emission of said second pulse on wire RDY.

The flip-flop generating the signal on wire 5 is reset by either a signal outgoing from said modulo-4 counter or a further signal supplied by the computer through wire RY; said further signal will be explained afterwards.

PD denotes a circuit for address recognition and data parallelization. Block PD comprises a conventional comparator which recognizes whether the address transmitted by the computer to all the interface circuits simultaneously, through a first part of connection D belonging to bus BE, is the same as that wired inside it. In the affermative, the comparator supplies the enabling signal on wire 5' towards block RC. Subsequently the presence of the signal on wire 5 enables a conventional 48-bits shift register, comprised in said block PD, to receive the data, transmitted by the computer through connection D, relative to the time codes of the entrance and exit points of an image sequence.

The data on connection D, analogously to those on connection TC, are encoded in BCD, and are sent by the computer in 8-bit parallel form.

The computer sends first the data relating to the entrance point and then those of the exit point, with the following order of the decimal digits for each point: tens of minutes, minutes, tens of seconds, seconds, tens of frames, frames.

A computer-generated clock signal, sent via wire CLK, synchronizes the data input into block PD through connection D. The first clock pulse causes the address loading into the address comparators: if the addresses are equal, a counter modulo-6 is preset to count the subsequent clock pulses.

The second clock pulse, which arrives after the reception of the signal on wire 5, causes, together with the following pulses up to the seventh, the loading of the data of the entrance and exit points into the parallel register.

Upon reception of the seventh clock pulse said modulo-6 counter authomatically resets and emits an enable signal allowing the data present in the parallelizing register of PD to be supplied to blocks COMP and DS which will be examined later: the data of the entrance point are supplied through bus D1 and those of the exit point through bus D2. Buses D1 and D2 consist of 24 wires each.

In addition, said enable signal will be supplied by PD through wire 6 towards OR circuit OR1 which receives also the signal present on wire 7 arriving from block ED, which will be described hereinafter.

Finally the eighth clock pulse determines the introduction of the "read/write" signal, relating to the operation which is to be carried out by the videorecorder; said signal is supplied via wire RW to block RPL, which will be described hereinafter.

Block PD comprises also a usual flip-flop, which, upon receiving from the computer the signal on wire ER1, which will be disclosed hereinafter, emits a signal on wire ER2 having the duration of the clock signal applied to one input via wire 4 and coming from block TB. Said signal on wire ER2 is applied to blocks SUB, BU, RPL which will be disclosed hereinafter.

The signal outgoing from OR1, present on wire ST, is then supplied to block SUB and to block BU consisting of a conventional flip-flop.

BU, as a consequence of the signal reception from the circuit OR1 (set signal), supplies on wire BSY1 a "busy" indication sent to the computer, through circuit COD, which has been already mentioned with reference to FIG. 1, so that, as long as said "busy" indication is present, the computer can no longer address the corresponding interface C1.

The "reset" signal for block BU, which resets also the "busy" signal on wire BSY1, will be either the signal on wire ER2 coming from block PD or the signal on wire SB coming from block ED.

The two clock signals: CL and CLK coming from videorecorder through connection I1 and from the computer through bus BE respectively, are uncorrelated.

From what previously stated, it comes out that the data present on buses TC1, D1, D2 arrive at block COMP at the same time.

Block COMP performs as a comparator. Its outputs give information on the position on the magnetic tape of the point being read by the videorecorder heads with respect to the entrance and exit points supplied by the computer: when the time code value of the point being read is greater than the codes of both the entrance and exit points, COMP emits a signal on wire 8; when the time code value of the point being read is less than those of said two points, COMP emits a signal on wire 9. When the data of the time code of the point being read coincide with those of the entrance point, COMP emits a signal on wire ENT, whereas when, they coincide with those of the exit point, COMP emits a signal on wire EXT.

Block COMP further compares the data supplied through uses D1 and D2; if the value of the time code of the entrance point is greater than or equal to that of the exit point, an error in setting the data into the computer has occurred; then a signal of "non-recoverable error (computer error)", is emitted via wire ER. Said signal, supplied to the computer, will send the relative program to a suitable error searching and signalling routine, which will be discussed ingreater detail later in connection with FIG. 5; that error signal needs not carry the address of the interface by which it has been generated, since the program is already addressed in the point where said error takes place. Therefore wires ER (FIG. 2) of each of the interface circuits C are interconnected through a usual wired-OR connection and a single wire will be connected to the computer through bus BE.

The computer identifies the interface circuit C which has received the erroneous data and emits thereto a reset signal. Said signal is sent via wire ER1 to the input blocks PD of the interface circuits: in correspondence with a first clock pulse on wire CLK the computer sends via D the address of the interface circuit C involved. In correspondance with a second clock pulse, it sends the signal over wire ER1, which is received only by block PD which has recognized the address previously sent.

Once received the signal on wire ER1, block PD emits the signal on wire ER2, as already mentioned, which will stop the corresponding videorecorder, as will be better expounded hereinafter The signals present on wires 8, 9 ENT, EXT are sent to block DL. In addition the signal on wire 8 is also supplied to block ED, which will be described hereinafter; the signals on wires ENT and EXT are also supplied to the corresponding videorecorder.

The duration of the signals on wires 8, 9, ENT, EXT and ER depends on the duration of the signals present on buses TC1, D1, D2, as the logic of block COMP is exclusively combinatory.

The person skilled in the art can easily design the circuitry of COMP on the ground of the above described operation.

Block DL performs as a decision logic. Depending on the signals present at its inputs, it emits a logic command signal onto wire 10 towards block DS. The latter block is a conventional switching circuit: the logic state of the signal on wire 10 determines which of the two data blocks, received from buses D1, D2, said switching device is to send towards the block SUB.

Block DL comprises a conventional logic circuit, whose output is wire 10. The implementation of DL is not a problem to the skilled in the art, once defined the logic functions it is to carry out. When the signal on wire 8 is active, or when neither the signal on wire 8 nor that on wire 9 are active, DL determines the logic state on wire 10 so that block DS sends block SUB the data present on bus D2; when on the contrary the signal on wire 9 is active, DL determines on wire 10 the opposite logic state, so that block DS sends block SUB the data present on bus D1. In addition when DL receives the first of the two equality signals coming from either wire EXT or wire ENT, it reverses the logic state on wire 10 so as to make circuit DS switch.

Upon receipt of the second equality signal a normal sequencer present in said block DL, emits a signal on wire SRC; said signal is sent to block SUB as "stop" signal, and also to the videorecorder to start the "search mode" operation.

Said signal on wire SRC will have the same duration as the clock signal on wire 3 applied in a known way to said sequencer.

The block SUB substracts the data coming from bus TC1 (time code of the point being read on the tape by the video-recorder) and the data coming from bus D3 (entrance or exit points).

Figure 3:
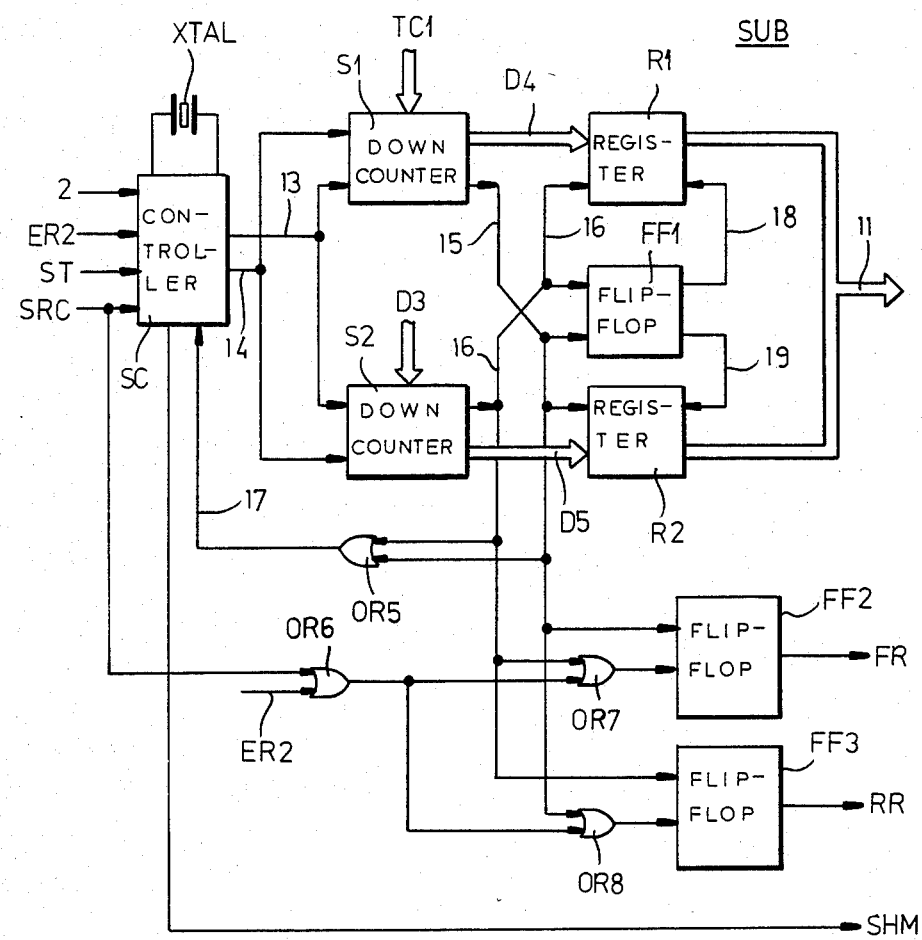
FIG. 3 shows a detailed scheme of block SUB in FIG. 2.

It is worth noting that block SUB no longer receives the least significant bits present on said buses, which bits are present on the contrary at the inputs of block COMP, corresponding to the frame number (tens of frams, frames) as will be resumed in connection with FIG. 3.

The absolute value of the difference is available on the 16-wire bus 11 (FIG. 2). The signals outgoing from SUB on wires RR and FR represent the difference sign: the signal present on RR indicates that the value supplied by bus TC1 is greater than that supplied by bus D3, while the signal on FR indicates the opposite condition.

Block SUB sends the videorecorder, through wire SHM, a signal which will be discussed when referring to FIG. 3.

In addition block SUB receives the signal of wire ER2 which resets the substractor and sets to zero the result at the output on bus 11, as will be disclosed in connection with FIG. 3.

Block DA is a conventional analog-to-digital converter apt to convert the result of the substraction executed by block SUB, supplied in digital form to its input through bus 11, into an analog signal according to a logarithmic conversion law.

Said converter emits a voltage indicative of the distance, which on the magnetic tape, separates the point being read by the videorecorder heads from the entrance or exit point of the sequence and is used to control the magnetic-tape speed during the search for these points. The use of a logarithmic conversion law allows high speeds of the tapes up to short distances from said points and consequently a reduction in the search time. On the other hand, for design requirements the tape speed in correspondence with said entrance and exit points must be nearly half the usual play speed; in fact, to be correctly interpreted by the videorecorder, the signals on wires ENT or EXT, generated by comparator COMP, must have a minimum duration of 40 ms.

The duration of the signals outgoing from comparator COMP is equal to that of the data coming from bus TC1 and the latter depends on the videorecorder tape speed. At normal play speed said duration in fact is 40 ms (one TV frame). Then, if the tape speed in correspondence with said points is half the play speed, the duration of said signals over wires ENT and EXT is about 80 ms; this duration is more than sufficient for the specific requirements.

Then output wire 14 of DA conveys an analog signal to block AT, dotted in the Figure, which operates as amplifier and level translator. The voltage to send onto wire SHV towards the videorecorder must lie in the range from +10 V, in order to obtain the maximum forward speed of the tape, to 0 V to obtain maximum rewind speed; in addition the value +5 V allows to stop the tape.

Then block AT comprises a usual amplifier and level translator TL fed either by a conventional non-inverting amplifier AN, or by a usual inverting amplifier AI, according to whether electronic switch IE1 (connecting wire 14 with the non-inverting amplifier AN) or electronic switch IE2 (connecting the wire 14 with the inverting amplifier A1) is operated. These switches are operated by the signal present on wire FR or on wire RR, respectively.

Block OR2 carried out the logic OR function between the signals present on wires RR and FR and sends its output signal to the videorecorder via wire SHS.

The videorecorder emits an identifying signal, which remains in the active (ON) state during the execution of the chosen function within the predetermined sequence: said signal is also supplied, via wire EI of bus I1, to blocks ED, EIC, OR3.

While block COMP detects, as already-mentioned, a faulty data load into the computer, block ED detects, during the time interval in which the wanted operation is executed inside a preordered sequence, an error made by the videorecorder while processing the information received relative to the entrance and exit points.

Two kinds of errors of the videorecorder can be identified by block ED:

the entrance point has been misinterpreted by the videorecorder: then the signal on wire EI becomes intermittent with a period of 400 ms instead of being steadily in the active state, during said time interval;

the exit point has been either misinterpreted or erased: then the signal on wire EI remains active even beyond the wanted exit point.

Block ED comprises a usual modulo-2 counter, which in correspondence with the second period of the signal on wire EI activates a usual sequencer, synchronized by the clock signal on wire 3; the sequencer emits on wire STP2 a "stop" signal whose duration is one period of said clock signal, and at the subsequent clock it emits on wire 7 a "restart" signal, this too of the duration of one period of said clock signal, which causes the repetition of the whole operation: in fact the signal on wire 7 is equivalent, to all the effects, to the "start" signal on wire 6.

In addition ED comprises a usual 3-input AND gate, not shown in the Figure, which receives the signals coming from wires 8 and EI and that obtained as logic OR of signals RL or PL (representative of the functions being carried out, "record" or "play", sent by the videorecorder): therefore the contemporaneous presence of said signals at said three inputs, signalling the second error type, causes the emission of an output signal, this too activating said sequencer as previously said.

Block ED further comprises a usual 3-bit shift-register, this too not shown in the Figure, which receives the signal of wire E1 and emits the signal on wire SB. Said register is synchronized by the clock signal at 0.5 s present on wire 3; in addition the input signal of the just-mentioned sequencer is applied to its clear input. The signal on wire SB serves to interrupt the busy signal supplied on wire BSY1 by block BU which will be mentioned hereinafter. Said shift register switches in correspondence with the leading edges of input signal EI. Then, if ED has not detected errors, at the exit of the sequence on which the videorecorder has operated, a leading edge of the signal on wire EI will be shifting inside the register, and at the third clock pulse it will appear at the output on wire SB. Instead, in the case in which ED has detected an error, the busy signal towards the computer has not to be interrupted, as all the videorecorder operations must be repeated anew, with the same data previously supplied by the computer itself. Then the input signal to the sequencer, now rendered active, is used to block the shift register so that even if the logic state of the signal on wire EI changes no signal will be present on wire SB.

Of course the delay introduced by the register is necessary to allow the counter to recognize the signal transitions on wire EI and to disable the register before the first of said transitions reaches the output.

Block EIC comprises a usual sequential logic whose embodiment is not a problem to the skilled in the art, one defined the operations to carry out.

The logic of block EIC supplies a "stop" signal on wire STP1, in correspondence with the leading edge of the signal on wire EI, i.e. in correspondence with the end of the sequence on which the videorecorder has operated; said stop signal has the same duration as the clock signal applied to clock input of EIC and coming from wire 3, and is applied to a first input of gate OR4.

In addition the logic supplies on wire 12 a logic level "1", beginning from the leading edge of the signal on wire EI: the signal on wire 12 is supplied at the input of gate OR3, which carries out the logic OR of the signals on wires 12 and EI.

Said signal on wire 12 serves to maintain at logic level "1" the signal on wire RE1 even if that on wire EI is blinking to signal an error: in this way, if the signal on wire RE1 was used to control the videorecording signal input from an external device towards the videorecorder, in case of error said input can be inhibited at the first alternance on wire EI.

The leading edge of the signal over wire ES, coming from the videorecorder, is used to "reset" the logic of EIC. The signal on wire ES is generally at logic level "1", apart from a pulse at logic level "0" signalling the end of the "search" phase and preceding by about 7 seconds the entrance into the wanted sequence and therefore the time interval in which the signal on wire EI becomes active at "0" level.

Block BU comprises a usual flip-flop which supplies an output signal on wire BSY1, when the signal on wire ST is applied to its "set" input; the signal on wire BSY1 recovers its non-active state when the signals on wires SB or ER2 are applied to the "reset" input of said flip-flop. Therefore the signal on wire SB indicates that the operation on the wanted sequence has been correctly completed, whilst the signal on wire ER2 indicates that the operation on the wanted sequence cannot start because a wrong data loading into the computer has been detected: in both cases the busy signal towards the computer (wire BSY1) is to be made inactive to allow the computer to send a new data of a new sequence to the interface circuit C1.

The signals on wires STP1, STP2, ER2 are sent to OR circuit OR4 whose output is connected to an input of block RPL.

Block RPL controls the record and play operations. RPL comprises a usual memory element which stores the read/write information coming from PD through wire RW. Upon reception of the signal coming via wire ES from the videorecorder, the stored signal is supplied to a usual sequencer in RPL, which generates either the "record" signal on wire REC or the "play" signal on wire PLY, according to the function chosen; said signals have the same duration as the clock signal supplied to the sequencer through wire 4. Besides, also the signals on wires VM (videomute) and AM (audiomute)

may be possibly generated to inhibit the reproduction of the signal during the recording mode.

The signal coming from circuit OR3 is supplied to another sequencer, also synchronized by the clock signal present on wire 4, which generates the "stop" signal on the wire STP to stop the videorecorder.

As shown in FIGS. 1 and 2, the connection TC and the wires CL, RYL, SL, PL, RL, EI, REC, PLY, STP, VM, AM, ES, ENT, EXT, SHV, SHS, SHM, SRC, RDY, form part of the bus I1 which connects the interface circuit C1 with the associated videorecorder VR1, while the connection D and wires RY, CLK, ER1, and ER form part of the bus BE connecting the computer with all the interface circuits C.

FIG. 3 shows a possible embodiment of substractor SUB.

Block SC is entrusted with a control function. It comprises a usual quarz-oscillator (denoted in the Figure by XTAL), generating a 10 MHz clock signal which is sent through wire 13 to blocks S1 and S2.

Block SC comprises also a usual sequential and combinatory logic constituting the circuit generating the start pulses, (i.e. the pulses starting the operation of blocks S1 and S2) supplied to said blocks through wire 14. The embodiment of said logic is not a problem to the skilled in the art once defined its logic functions, as it will be made later.

Blocks S1 and S2 are two usual down counters synchronized by the clock signal coming from SC through wire 13.

Two initial values received from bus TC1 (time code of the point being read on the tape) and from bus D3 (time code of the predetermined entrance or exit point) are preset into said counters.

As already mentioned, the least significant bits, i.e. the bits relative to the frame number, are not supplied to blocks S1 and S2, which receive instead, the most significant bits of the time code, i.e., those relative to the minutes and seconds. As said data are coded in BCD notation and obviously the number of the tens of seconds, does not exceed the decimal value 5, the portion of said counters S1 and S2 relative to the tens of seconds will be realized so as to count only up to 5.

Of course, in the design of converter DA of FIG. 2, the fact is to be taken into account that the maximum value of the tens of seconds in decimal notation is not 9, but 5, so that the counter does not introduce excessive jumps in the analog voltage at its output when passing from a sexagesimal value to the contiguous one (e.g. 52'00" and 51'59"): this design requirement is not a problem to the person skilled in the art.

Upon reception of a pulse via wire 14, S1 and S2 begin counting by decrementing by a unit at each clock pulse received.

When one of the two counters reaches "zero" the result of the substraction will be present in the other.

At that instant, the counter which has reached zero emits on wire 15 (S1), or 16 (S2), an end-of-count signal consisting of a pulse active at low logic level, which enables the loading of the value present in the other counter into one of the two registers R1 or R2: the data coming from counter S1 through bus D4 are loaded into R1, enabled through the signal on wire 16, while the data coming from counter S2 through bus D5 are loaded into R2, enabled through the signal on wire 15.

The signals present on wires 15 and 16 are supplied to two usual flip-flops FF1, FF2, which will be mentioned hereinafter and also to OR circuit OR5.

The output signal of OR5 is sent through wire 17 to block SC and is present when one of the two counters has reached 0.

Going back to the operation of block SC, the signal on wire ST, supplied to one of its inputs and present when the data loading by the computer in block PD is over, forms the "start" pulse for the beginning of the first substraction executed by the substractor SUB and then it is the "preset" pulse of block SC. The actual "set" pulse is the first clock pulse subsequent to the sending of the pulse over wire ST and is sent by clock generator TB via wire 2. At this instant block SC supplies the signal on wire 14 and at the same time inhibits the circuit generating the start pulse until the signal indicating the operation end appears. Only from said instant on, a subsequent clock pulse coming from wire 2 will give origin to the subsequent "start" pulse on wire 13 for counters S1 and S2.

As previously stated with reference to the operation of block DL (FIG. 2), the signal on wire SRC, when it is generated, indicates the end of the operations. Thus said signal, applied to block SC (FIG. 3) forms the stop signal for the substractor.

Also the signal on wire ER2 is a "stop" signal for the substractor.

Block SC contains in addition a usual flip-flop to generate an output signal on wire SHM (see also FIG. 2) upon reception at its "set" input of the signal on wire ST; the signal on wire SHM ends when either the signal on wire SRC or even that on wire ER2 is supplied to the "reset" input of said flip-flop.

The outputs of registers R1 and R2 on the common bus 11 are of the type known as "three state" whose high impedance state can be controlled from the outside. In particular, if the outputs of only one of said registers are in that high-impedance state, the logic levels supplied by the other register will be present on bus 11.

In the present case, the high impedance state of the outputs of registers R1 and R2 is controlled from the outside through a usual flip-flop FF1: the signal on wire 16 will control the high-impedance state of the outputs of register R2 through wire 19, while the signal on wire 15 will control the high-impedance state of the outputs of register R1 through wire 18.

In this way as a result of the performed substraction the data of register R1 or R2 will be present on bus 11 according to whether counter S1 or counter S2 has reached 0.

The signal on wire 15 is also applied to the "set" input of flip-flop FF2 to generate the signal on wire FR, while the signal 16 is applied to the "set" input of flip-flop FF3 to generate the signal on wire RR; in addition, as the presence of signals FR or RR is mutually exclusive, signal 16 is applied to the "reset" input of FF2 through gate OR7 and signal 15 is applied through gate OR8 to the "reset" input of FF3. Both flip-flops are also reset by the signal outgoing from gate OR6, applied to the second input of gates OR7 and OR8, when a signal is present on wire SRC or on wire ER2, both signals being applied to the inputs of OR6.

Figure 4A:
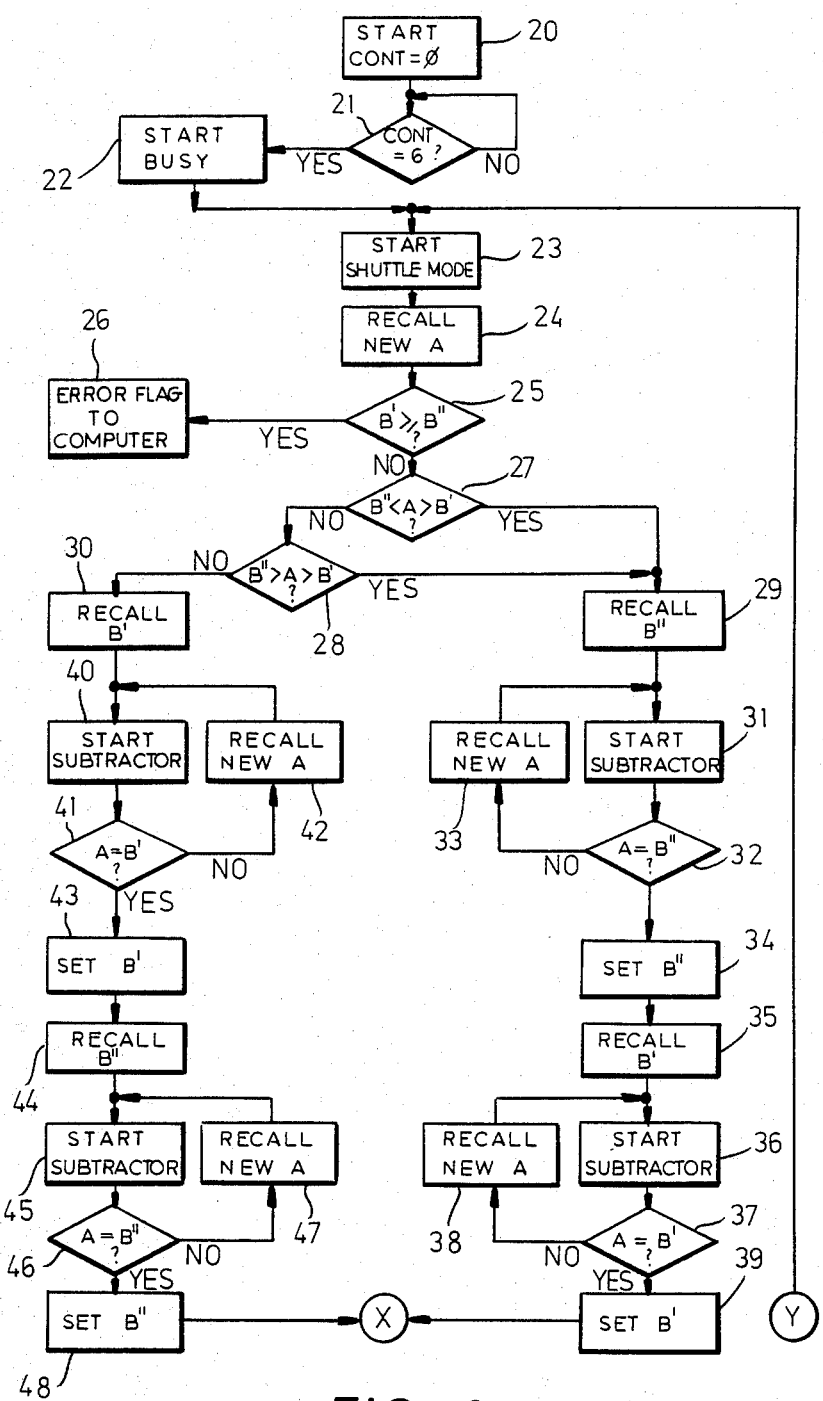
FIGS. 4a, 4b are flow charts illustrating the operations of each interface circuit.
Figure 4B:
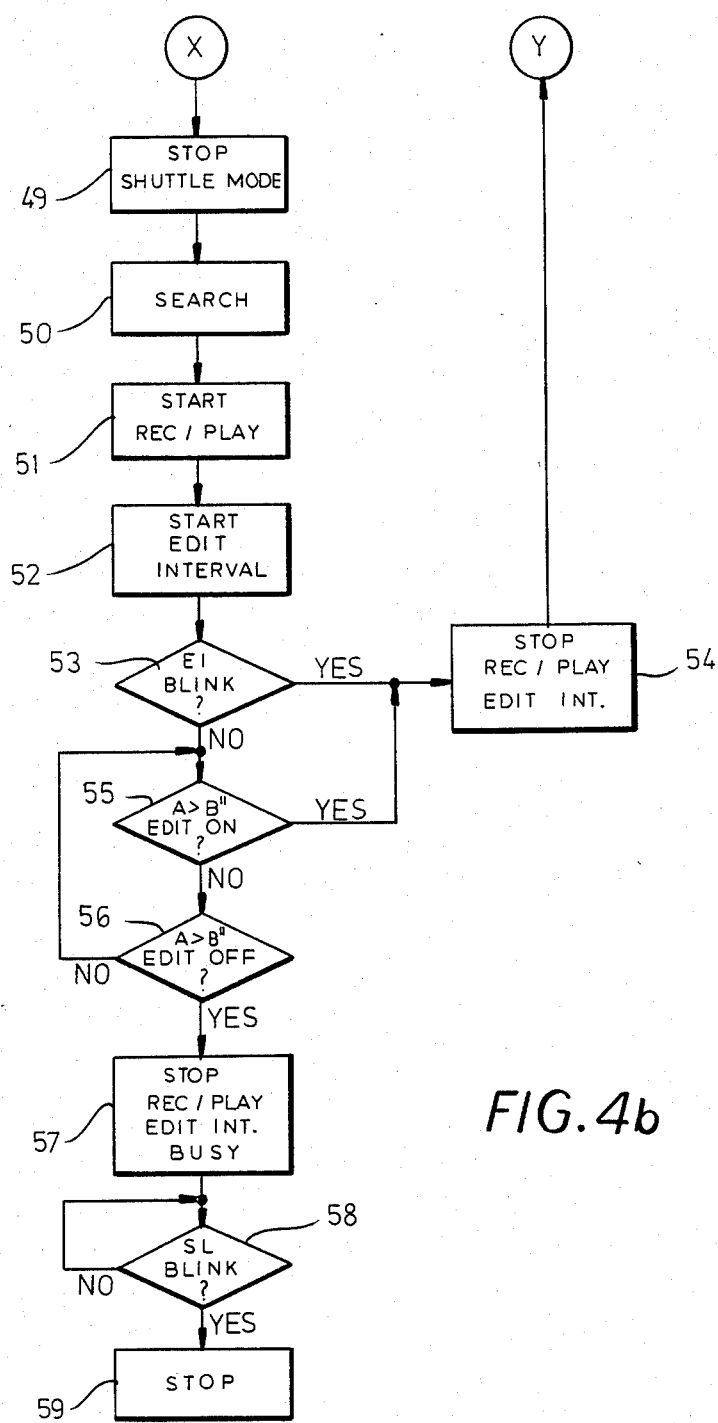

FIGS. 4a and 4b show a flow-chart useful to explain the operation of each interface circuit, e.g., of CI.

The "start" operation of block 20 corresponds to the turning on of the videorecorders and of the interface circuits and to the consequent reset of the sequential circuits, e.g. the counter of the clock pulses inside block PD, FIG. 2.

The computer emits on connection D the address of interface circuit C1: block PD of C1 recognizes it and emits a signal on wire 5' which enables block RC to receive the "ready" signal RY also sent by the computer. The signal RY allows block RC to generate signal RDY enabling the videorecorder.

After 5 seconds, if signal RYL has arrived from the videorecorder, block RC generates the signal over wire 5 towards block PD.

From this point on, through connection TC, the data of the time code of the frames progressively read by the videorecorder heads, begin to arrive at block TCD, at a rate determined by clock signal CL.

In addition the computer begins to send the data of the entrance and exit points of the predetermined sequence on connection D towards block PD, together with the clock pulses CLK which are counted by the counter inside PD.

This operation is also shown in the block 21 of FIG. 4a. Once received the sixth clock pulse, all the data are loaded into PD (FIG. 2) and said counter emits a signal on wire 6; through OR1 and wire ST this signal is sent as "start" signal to block BU, which generates the busy signal BSY1 towards the computer, as well as to block SUB, which is enabled to begin the substractions and sends the videorecorder signals SHS and SHM starting the shuttle mode operation.

The "start busy" and "start shuttle mode" operations are indicated by blocks 22 and 23 in FIG. 4a.

If on the contrary, signal RYL has not arrived, no signal is generated on wire 5.

When the computer sends the data, these are not received by PD. No signal is generated on wire 6 and consequently on wire BSY1. Said event will be considered in details in connection with FIG. 5.

Blocks 25, 27, 28 (FIG. 4a) denote the comparisons carried out by comparator COMP (FIG. 2) on the data coming from TC1, D1, and D2, before the substractor SUB starts its operations.

For clarity purposes, the data coming from bus TC1 will be denoted by the letter A; the data of the entrance point, coming from bus D1 will be denoted by the letter B', the data of the exit point coming from bus D2 will be denoted by the letter B".

Block 24 denotes the sending by block TCD to block COMP (FIG. 2) of the first datum A subsequent to the reception of data B' and B".

If B' is greater than or equal to B" (block 25 of FIG. 4a), COMP signals a faulty data load to the cmputer through wire ER (block 26 of FIG. 4a). As will be seen also in connection with FIG. 5, the computer replies with a signal on wire ER1 towards block PD of the interface; the operations started by said signal on wire ER1 have already been described in connection with FIG. 2.

If, on the contrary, B' is smaller than B", COMP (FIG. 2) checks whether A is greater than both B" and B' (block 27 of FIG. 4a): if it is so, COMP emits the signal on wire 8 and the interface C1 executes the next operation denoted by the block 29 of FIG. 4a, which will be described later; in the negative COMP executes a further check. If A is smaller than B" and at the same time greater than B' (block 28 of FIG. 4a), COMP emits no signals on wires 9 and 8 (FIG. 2); also in this case interface C1 executes the operation of block 29 (FIG. 4a) which is the first of a series of operations which allow the search on the videorecorder magnetic-tape first for the exit point B" and then for the entrance point B'.

Otherwise block COMP emits only the signal on wire 9 and interface C1 executes the operation of block 30 (FIG. 4a) which is the first of a series which allows the search on the videorecorder magnetic tape first for the entrance point B' and then for the exit point B".

According to the mode of operation of blocks COMP, DL, DS and SUB already described with reference to FIG. 2, block 29 of FIG. 4a (recall B") denotes the sending of data B" over bus D3 (FIG. 2) towards SUB. At this point substractor SUB begins substracting data A and B" stopping when block COMP will recognise the equality between said two data.

The result of each operation will be supplied in digital form over bus 11 of FIG. 2 to the digital to analog converting system DA, AT, already described, which will supply a suitable analog voltage over wire SHV to the videorecorder to control the magnetic tape speed.

Blocks 31, 32, 33 of FIG. 4a denote the substraction (start substractor), the equality check on data A and B", and a recall of a new datum A to block SUB (recall new A).

If A and B" were found different by COMP, then substractor SUB will start a new substraction. If on the contrary A and B" were equal block COMP (FIG. 2) emits the signal on wire EXT to store in to the videorecorder memory the datum of the exit point, as already described with relation to FIG. 2. Said operation is indicated by block 34 of FIG. 4a (set B"). Afterwards circuit DS (FIG. 2) switches to supply on bus D3 the data B', and hence the substractor SUB (FIG. 2) starts a new operation cycle on data A and B' till block COMP detects the equality of the two data: then COMP emits the signal on wire ENT to store into the videorecorder memory the entrance point datum.

Said operations are indicated in FIG. 4a by blocks 35 (recall B'), 36 (start substractor ), 37 (A=B'), 38 (recall new A) and 39 (set B').

Blocks 30 and 40 to 43 denote the same operations as blocks 35 to 39, while blocks 45 to 48 denote the same operations as blocks 29 and 31 to 33.

When data B' and B" have been found, circuit DL emits on wire SRC (FIG. 2) a "stop shuttle mode" signal, which stops the substractor (block 49 of FIG. 4b), and a "search" signal (block 50 of FIG. 4b), already mentioned in connection with FIG. 2.

Once the search step is over, the videorecorder emits the signal ES (FIG. 2), and block RPL upon reception of said signal presets the videorecorder to the recording or playing (block 51 of FIG. 4b, start rec/play); at the same time block EIC is reset, as explained with reference to FIG. 2.

When the magnetic tape is positioned on the entrance point, the videorecorder begins to supply the signal ED identifying the wanted sequence (block 52 of FIG. 4b start edit interval).

At this point block ED begins to check whether the videorecorder has correctly interpreted and memorized data B' and B".

If the signal EI is blinking (block 53 of FIG. 4b, EI blink) the videorecorder has misinterpreted datum B'; then ED through signal STP2 causes RPL to generate signal STP stopping the functions in progress (block 54 of FIG. 4b, stop rec/play EI); after that, ED (FIG. 2 emits the "restart" signal on wire 7 to start anew the whole search for the exit and entrance points (return from block 54, FIG. 4b, to block 23, FIG. 4a).

If, on the contrary, signal EI is continuously active the videorecorder continues to execute the wanted function in the sequence and block ED (FIG. 2) begins checking whether and when the videorecorder will correctly end said function.

In other words if the condition A>B" occurs, i.e. if both the signal on wire 8 (FIG. 2) and signal EI are active, the videorecorder has misinterpreted the datum B" and would go on indefinitely with said function; then also in this case ED generates the stop signal STP2, as seen in the preceding case.

In FIG. 4b that is indicated by block 55 (A>B", Edit on) and by the connection between blocks 55 and 54 and the subsequent return to block 23 of FIG. 4a, to repeat anew the whole search procedure.

At the same time ED checks whether and when A becomes greater than B" and signal EI is disactivated (block 56 of FIG. 4b, A>B", EDIT off); when that occurs, the whole operation inside the wanted sequence has been correctly concluded. Then ED (FIG. 2) generates stop signal STP2, but no longer the restart signal on wire 7; in addition ED generates the "busy end" signal SB towards the computer, which presets interface circuit C1 to receive a new series of data and to begin a new procedure (block 57 of FIG. 4b, stop rec/play, EDIT INT. busy). Otherwise block ED continues to carry out the two last mentioned checks as denoted in FIG. 4b by the return from block 56 to 55.

After the operations denoted by block 57, the videorecorder remains in state wait for new commands: if it does not receive any other command within a determined time period, it emits square-wave signal SL (FIG. 2). Then the modulo-4 in block RC checks whether and when signal SL is present (block 58 of FIG. 4b, SL blink), and at the fourth period of SL, it generates the second pulse on wire RDY (FIG. 2) which turns off the videorecorder (block 59 of FIG. 4b, stop).

Figure 5:
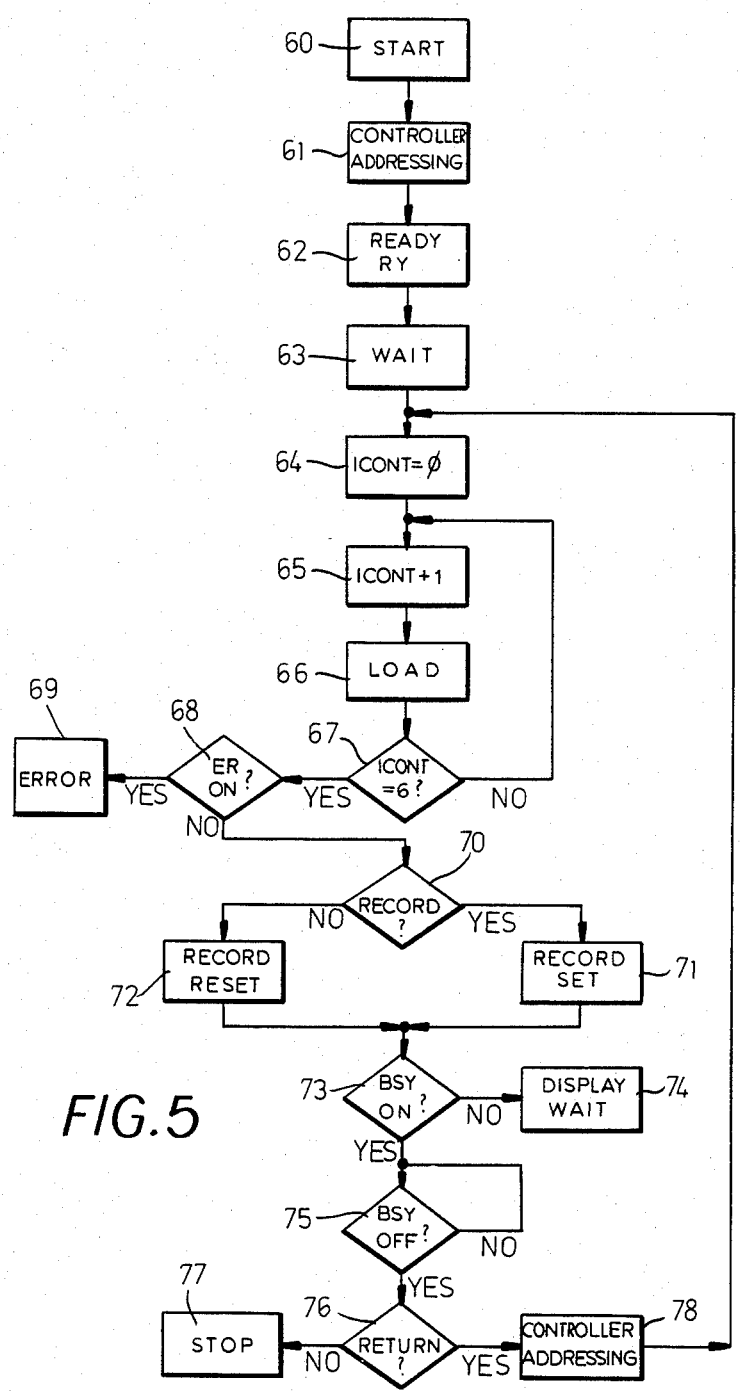
FIG. 5 is a flow chart of the computer program portion which controls the operation of one of the interface circuits.

In FIG. 5 the flow chart is shown of a possible example of the portion of the computer program relative to the control of the operation of one of the interfacing circuits C.

The computer is programmed according to the well-known multiprogramming technique, so that it can control in real time the simultaneous operation of a plurality of interface circuits C.

The main program comprises an initial step of data loading, by instance through a videoterminal. For each operation to carry-out and for each videorecorder involved, the data relative to the address of corresponding interface circuit, to the entrance and exit points of the desired sequence, and to the type of operation to carry-out will be stored. Once the data have been loaded, the computer will begin to control the various interface circuits by means of subroutines, one of which is depicted in FIG. 5.

After the start, (block 60) the computer addresses the interface circuit (Block 61, controller addressing) and emits the ready signal RY, as already described, (block 62, VPR ready). After writing for 5 seconds (block 63, wait), it begins to load the data of the entrance and exit points: an internal counter is reset (block 64, ICONT=0), and subsequently advanced by one step (block 65, ICONT+1) at each step of data loading (block 66, load).

When the counter reaches value 6 (block 67, ICONT=6), the data loading is over. Then the computer checks whether the signal ER, possibly sent by the interface, is active (FIG. 2) i.e. it checks whether a faulty data loading from the video terminal has occurred, (block 68, ER on): in the affirmative the program goes to a routine of error search and signalling (block 69, error) which provides for the display through videoterminal of the erroneus data and the consequent generation of signal ER1, already mentioned with reference to FIG. 2.

Besides, said routine allows correction of erroneous data, also through videoterminal, and the passage to the next operation between videorecorders, while said correction is effected; the operation previously interrupted is then started again. If no loading error has occurred, the computer sends the last data bit, the one relative to the operation to execute: if a recording is to be done, (block 70 of FIG. 5, record) the "record set" bit is loaded, (block 71) otherwise the opposite bit, ("record reset", block 72) is loaded.

After the data loading, the computer checks whether the busy signal BSY has arrived at the addressed interface (BSY ON); in the negative, the computer signals this fact on the videoterminal and waits for the operator's command (block 74, display and wait): for instance the return to the beginning of the interface addressing or the passage to a subsequent operation can be commanded. If on the contrary signal BSY has arrived the interface circuit has regularly begun to control the videorecorder; then the computer will go on checking when the interface has ended the operations; i.e. when the signal BSY becomes inactive (block 75, BSY OFF).

Afterwards, if the interface is to carry out other operations, (block 76, return) the computer will go back to block 64, to begin the load of another data set, by addressing the interface again (block 78, controller addressing).

Otherwise, having no further data to supply to said interface, the computer will go out from said subroutine, (block 77, STOP), by supplying a second "ready" signal on wire RY which, as already explained in relation with FIG. 2, will disactivate the relative videorecorder.

It is to be appreciated that most of the controls are left to the interfaces so that in the execution of that management program, there are long and frequency waiting times, during which the computer can advantageously carry out other programs.

Modifications and variations can be made without going out of the scope of the invention.

I claim:

1. Apparatus for automatic computer control of the execution of a selected one of a plurality of determined operations in an operating range starting from an entrance frame and ending at an exit frame, by a selected one of a plurality of video recorders each having video tape carrying sequential frame identifying data identifying each television frame recorded thereon, said apparatus comprising:

computer means having stored data comprising a plurality of control unit addresses, digital entrance frame data, digital exit frame data, and operational data signifying said selected one of said determined operations; and a plurality of control units, each connected to said computer means and to a corresponding one of said video recorders, each addressable by a respective one of said control unit addresses, each comprising:

motion control means for reading out then-present frame identification data from the respective one of said video tapes, receiving said digital entrance and exit frame data from said computer means, generating a tape control signal varying in dependence on the so read-out and received data, and applying said tape control signal to said selected one of said video recorders to control the speed and direction of motion thereof;

first error detecting means receiving said digital entrance frame data and said digital exit frame data from said computer means, for comparing the so-received data, generating a computer error signal when said digital entrance frame data is inconsistent with said digital exit frame data, and applying said computer error signal to said computer means;

and second error detecting means receiving said entrance and exit frame identification data, for applying a restart signal to said motion control means when said selected one of said video recorders is carrying out said selected one of said determined operations outside said operating range.

2. Apparatus as set forth in claim 1 wherein each of said video recorders has forward and return speed control means varying said direction and speed of said tape in accordance with said tape control signal; and wherein said tape control signal is a tape control voltage adapted to vary said forward and return speed of said tape in accordance with the difference between said exit and entrance frame data and said frame identification data.

3. Apparatus as set forth in claim 2, further comprising means for synchronizing said selected one of said tape recorders to said corresponding one of said control units.

4. Apparatus as set forth in claim 2 wherein said computer means transmits address signals identifying said selected one of said plurality of video recorders to said control units; and wherein each of said control units further comprises address receiving means having an internally stored address and means for comparing said internally stored address to said address signals and furnishing a first enabling signal in response to correspondence therebetween.

5. Apparatus as set forth in claim 4, wherein said computer means and said video recorder generate a computer and video recorder ready signal, respectively, when ready;

and wherein said motion control means further comprises operation control means receiving said first enabling signal and said computer and recorder ready signals for starting said video recorder in response thereto.

6. Apparatus as set forth in claim 5, wherein said computer furnishes a reset signal to said control unit upon receipt of said computer error signal.

7. Apparatus as set forth in claim 2, wherein said motion control means comprises comparator means for comparing said digital entrance and exit data to said then present frame identification data, generating a first comparator output signal when said then present frame identification data exceeds both said digital entrance and said digital exit frame data, a second comparator output signal when said then present frame identification data is less than said digital entrance and exit frame data, a third comparator output signal when said then present frame identification data is equal to said digital entrance frame data, and a fourth comparator output signal when said digital exit frame data is equal to said then present frame identification data;

logic means connected to said comparator means for furnishing a data selector signal corresponding to the so-generated comparator output signal;

data selector means for selecting said digital entrance or said digital exit frame data in response to said data selector signal;

subtractor means connected to said data selector means for subtracting said then present frame identification data from the selected one of said digital entrance and exit frame data and furnishing a subtractor output signal signifying the difference therebetween; and digital analog/converter means for converting said subtractor output signal to said tape control voltage.

8. Apparatus as set forth in claim 7, wherein each of said video recorders further furnishes a record or a play signal when in a record or play mode, respectively;

and wherein said second error detecting means comprises means for applying said restart signal to said motion control means in response to simultaneous presence of said record or play signal and said first comparator output signal.

* * * * *